United States Patent
Kudo (10) Patent No.: US 10,845,344 B2
(45) Date of Patent: Nov. 24, 2020

(54) DATA PROCESSING DEVICE FOR CHROMATOGRAPH MASS SPECTROMETER

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 164 days.

(21) Appl. No.: 16/308,886

(22) PCT Filed: Jul. 8, 2016

(86) PCT No.: PCT/JP2016/070300
§ 371 (c)(1),
(2) Date: Dec. 11, 2018

(87) PCT Pub. No.: WO2018/008149
PCT Pub. Date: Jan. 11, 2018

(65) Prior Publication Data
US 2020/0309748 A1    Oct. 1, 2020

(51) Int. Cl.
*H01J 37/26* (2006.01)
*H01J 37/00* (2006.01)
(Continued)

(52) U.S. Cl.
CPC ..... *G01N 30/8631* (2013.01); *G01N 30/7206* (2013.01); *G01N 30/8679* (2013.01); *G01N 30/8682* (2013.01); *H01J 49/0036* (2013.01)

(58) Field of Classification Search
CPC ........... G01N 30/8631; G01N 30/7206; G01N 30/8679; G01N 30/8682; H01J 49/0036; H01J 49/26; H01J 49/28
(Continued)

(56) References Cited

U.S. PATENT DOCUMENTS

| | | | |
|---|---|---|---|
| 2008/0272292 A1* | 11/2008 | Geromanos | H01J 49/26 250/288 |
| 2016/0202219 A1 | 7/2016 | Sakamoto | |
| 2020/0088700 A1* | 3/2020 | Yamaguchi | G01N 30/86 |

FOREIGN PATENT DOCUMENTS

| | | |
|---|---|---|
| CN | 105518448 A | 4/2016 |
| EP | 3043175 A1 | 7/2016 |

(Continued)

OTHER PUBLICATIONS

Written Opinion dated Sep. 13, 2016 in application No. PCT/JP2016/070300.
(Continued)

*Primary Examiner* — Nicole M Ippolito
(74) *Attorney, Agent, or Firm* — Sughrue Mion, PLLC (57) ABSTRACT

Respective peaks detected on chromatograms created based on data obtained by conducting GC-MS analysis on a target sample are identified based on information stored in a compound database (S1, S2). A retention time list indicating relationships between compounds and measured peak retention times is created based on results of identification of the peak. Then a plurality of compounds in which the measured retention times are identical to each other or are within an allowable range are extracted and are combined into one group (S3, S4). A determination is made whether overlapping identifications exist by determining whether a single group includes a plurality of compounds (S5, S6). Retention times, mass spectrums, and confirmation ion ratio reference values stored in the compound database are used for the respective groups in which overlapping identifications are likely to exist so that a most likely compound candidate is selected (S7).

17 Claims, 4 Drawing Sheets

(51) Int. Cl.
    *G01N 30/86*      (2006.01)
    *G01N 30/42*      (2006.01)
    *H01J 49/00*      (2006.01)
    *G01N 30/72*      (2006.01)

(58) Field of Classification Search
    USPC .................................. 250/281, 282, 283, 286
    See application file for complete search history.

(56) References Cited

FOREIGN PATENT DOCUMENTS

| | | |
|---|---|---|
| JP | 09-043199 A | 2/1997 |
| JP | 2011-033346 A | 2/2011 |
| WO | 2015033397 A1 | 3/2015 |

OTHER PUBLICATIONS

Communication dated Jun. 25, 2019, from the European Patent Office in application No. 16908193.2.
International Search Report for PCT/JP2016/070300 dated Sep. 13, 2016 [PCT/ISA/210].
Communication dated Oct. 12, 2020 from the State Intellectual Property Office of the People's Republic of China in application No. 201680087503.4.

\* cited by examiner

Fig. 3A LIST OF RETENTION TIME

| COMPOUND NAME | SET RETENTION TIME | MEASURED RETENTION TIME OF IDENTIFIED PEAK |
|---|---|---|
| A | Ta | x1 |
| B | Tb | x1 |
| C | Tc | x2 |
| D | Td | x3 |
| E | Te | x2 |
| F | Tf | x3 |
| G | Tg | x3 |

Fig. 3B AFTER GROUPING

| GROUP | COMPOUND NAME | SET RETENTION TIME | MEASURED RETENTION TIME OF IDENTIFIED PEAK |
|---|---|---|---|
| 1 | A | Ta | x1 |
| 1 | B | Tb | x1 |
| 2 | C | Tc | x2 |
| 2 | E | Te | x2 |
| 3 | D | Td | x3 |
| 3 | F | Tf | x3 |
| 3 | G | Tg | x3 |

Fig. 3C SELECTION OF MOST LIKELY IDENTIFIED RESULT

| GROUP | COMPOUND NAME | SET RETENTION TIME | MEASURED RETENTION TIME OF IDENTIFIED PEAK |
|---|---|---|---|
| 1 | A | Ta | x1 |
| 1 | B | Tb | x1 |
| 2 | C | Tc | x2 |
| 2 | E | Te | x2 |
| 3 | D | Td | x3 |
| 3 | F | Tf | x3 |
| 3 | G | Tg | x3 |

Fig. 3D CORRECTION OF RESULTS SO THAT ONLY SELECTED RESULT REMAINS

| COMPOUND NAME | SET RETENTION TIME | MEASURED RETENTION TIME OF IDENTIFIED PEAK |
|---|---|---|
| A | Ta | x1 |
| C | Tc | x2 |
| D | Td | x3 |

Fig. 4A  MEASURED TIC

Fig. 4B  RESULT OF IDENTIFYING TARGET PEAK

| COMPOUND NAME | SET RETENTION TIME (min) | MEASURED RETENTION TIME (min) | DIFFERENCE BETWEEN MEASURED RETENTION TIME AND SET RETENTION TIME (ABSOLUTE VALUE, min) | SIMILARITY |
|---|---|---|---|---|
| 3-Hydroxy-3-methylglutaric acid-3TMS | 11.606 | 11.74 | 0.134 | 80 |
| 3-Aminoglutaric acid-3TMS | 11.713 | 11.739 | 0.026 | 73 |
| Ornithine-3TMS | 11.713 | 11.739 | 0.026 | 73 |
| Glutamic acid-3TMS | 11.762 | 11.74 | 0.022 | 97 |

< 0.2 ALLOWABLE VALUE OF RETENTION TIME SHIFT

70 < SIMILARITY LOWER LIMIT VALUE

DATA PROCESSING DEVICE FOR CHROMATOGRAPH MASS SPECTROMETER

CROSS REFERENCE TO RELATED APPLICATIONS

This application is a National Stage of International Application No. PCT/JP2016/070300 filed Jul. 8, 2016.

TECHNICAL FIELD

The present invention relates to a data processing device for chromatograph mass spectrometer that processes data collected by a chromatograph mass spectrometer, such as a gas chromatograph mass spectrometer (GC-MS) configured by a combination of a gas chromatograph (GC) and a mass spectrometer or a liquid chromatograph mass spectrometer (LC-MS) configured by a combination of a liquid chromatograph (LC) and a mass spectrometer.

BACKGROUND ART

In a test for a blood level for a drug or screening of urine metabolite, simultaneous multi-component analysis is often conducted by using a chromatograph mass spectrometer. In such an analysis, data of a lot of compounds possibly included in samples is stored in a database (a compound table) in advance, and it is determined whether a compound stored in the database is included in the sample of blood or urine, based on data obtained by conducting scanning measurement (or selected ion monitoring (SIM) measurement or multiple reaction monitoring (MRM) measurement at mass-to-charge ratios listed stored in the compound table) on a target sample in the GC-MS or the LC-MS. When any compound stored in the database is included, quantification of the compound is conducted further according to requirement.

As one example, a procedure for identifying a compound in a target sample based on the data obtained by the scanning measurement in the GC-MS will be simply described. It is supposed here that, the following data set is already stored in the database for each of compounds including those that may be included in the sample: a retention time (hereinafter, the retention time stored in the database is referred to as a "set retention time"), a standard mass spectrum, mass-to-charge ratios of a quantitative ion and a confirmation ion, and a reference value (hereinafter, a "confirmation ion ratio reference value") for a confirmation ion ratio (a peak area ratio or a peak height ratio of the quantitative ion and the confirmation ion).

First, the set retention time and the mass-to-charge ratios of a quantitative ion and a confirmation ion for a compound intended to be identified (hereinafter, a "target compound") are read out from the compound database. Then, based on data obtained from a target sample, mass chromatograms at the mass-to-charge ratios of the quantitative ion and the confirmation ion (extracted ion chromatograms) within a predetermined time range including the set retention time are created. A peak detection is carried out on each of the mass chromatograms, and the values of the area or the height of the detected peak is obtained. A confirmation ion ratio is calculated from the values of the peak area (or height) obtained by actual measurement, and a determination is made whether the confirmation ion ratio obtained by the actual measurement falls within a predetermined allowable range based on the confirmation ion ratio reference value read out from the compound database. Alternatively, instead of using the confirmation ion ratio, a similarity in a spectrum pattern between the mass spectrum actually measured at a peak top time of a peak detected on a mass chromatogram of the quantitative ion and a standard mass spectrum read out from the compound database is calculated, and a determination is made whether the similarity is greater than or equal to a predetermined threshold. Further, in some cases, both these determination methods are used. When criteria are satisfied, a determination is made that the peak on the mass chromatogram is a peak of the target compound (for example, see Patent Literature 1).

When no related peak is found for a certain target compound, a determination may be made that the target compound does not exist in a target sample. Therefore, by conducting the above-described data processing on all compounds stored in the compound database (or on some of them selected by an analyst), it can be determined whether each of the compounds exists or not in the sample. Note that since such a data processing operation is done to determine which peak is related to which compound, it may be called an operation for "identifying a peak as a compound".

However, when a peak on the chromatogram is identified as a certain compound by the above-described procedure, one peak actually derived from one compound is occasionally misidentified as a peak derived from a plurality of compounds. This can happen when the target sample includes different compounds in which mass-to-charge ratios of a quantitative ion and a confirmation ion are both the same, and the retention times of the compounds are close to each other. Further, such misidentification can happens when the target sample contains a compound whose mass spectrum includes peaks of mass-to-charge ratios of a quantitative ion and a confirmation ion of another compound, and the retention times of the compounds are close to each other. Such identification of one peak as the plurality of compounds is called overlapping identifications.

Figure 4A:
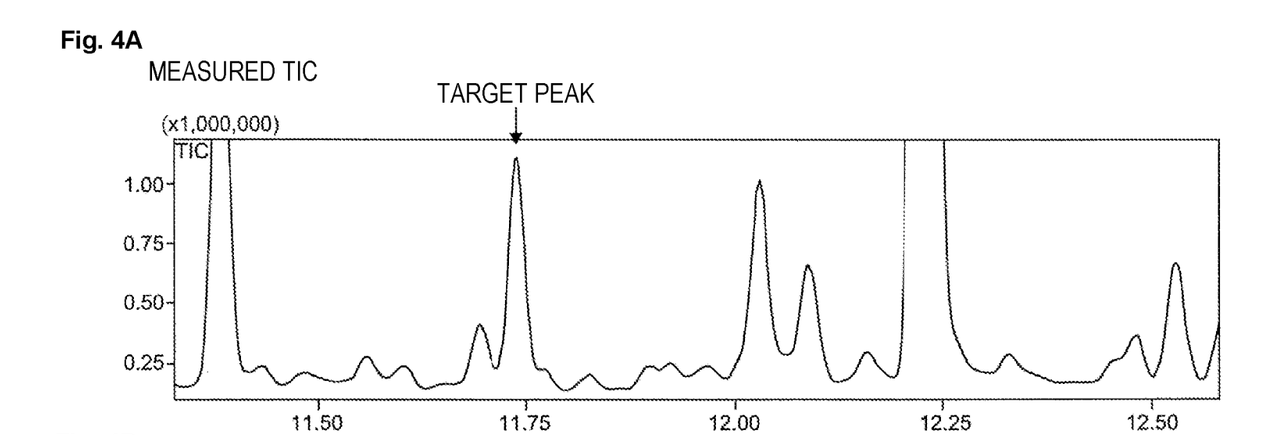
FIGS. 4A-4B are a diagram illustrating an example of overlapping identifications of a peak on a chromatogram in a conventional data process.
Figure 4B:
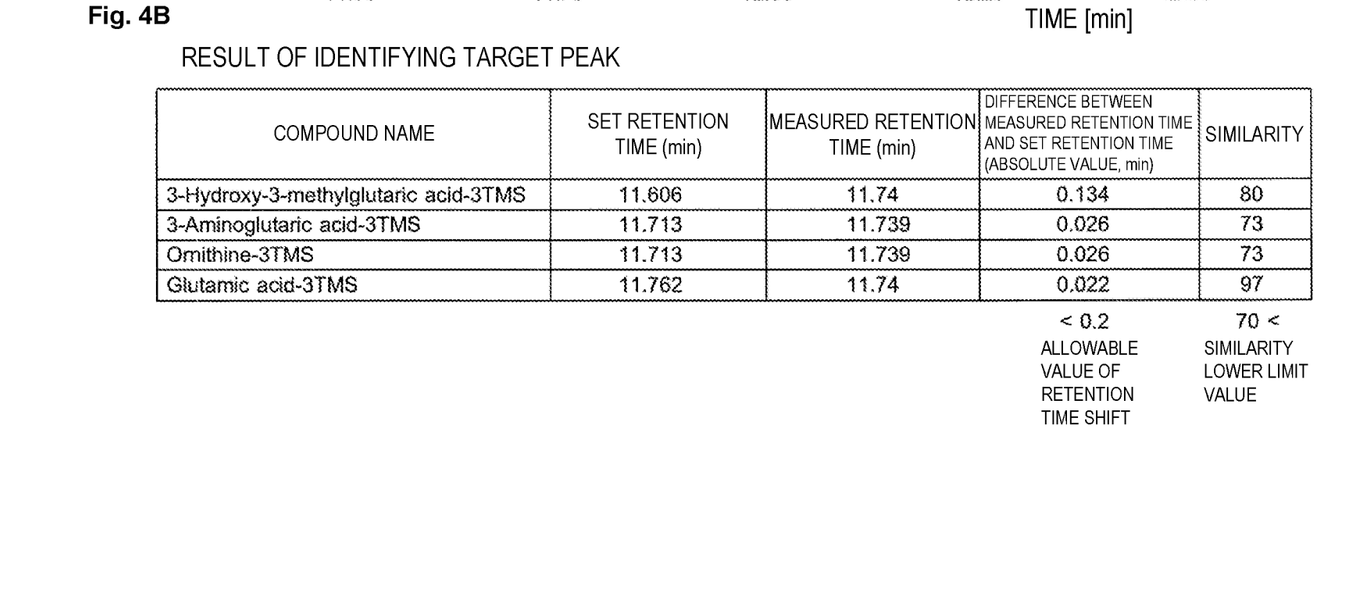

FIGS. 4A and 4B illustrate an example of the overlapping identifications. FIG. 4A shows a chromatogram (total ion chromatogram) obtained by actual measurement. It is supposed here that, as criteria of peak identification, a tolerance in a difference between a measured retention time and a set retention time in the compound database is set to 0.2 min, and a threshold of a similarity in mass spectrum patterns is set to 70. FIG. 4B shows results of identification of compounds for a target peak indicated by an arrow in FIG. 4B. Four compounds listed in the table of FIG. 4B are determined as compound candidates related to the target peak because these compounds all satisfy the criterion of the peak identification.

In simultaneous multi-component analysis, the above-described process is automatically executed on each peak on the chromatogram, and compound candidates related to each peak are determined. Whether a plurality of compound candidates are determined for a certain peak, namely, whether there are overlapping identifications, is revealed only after obtaining the results of identification of the peak. For this reason, conventionally a search is made by an analyst whether each peak has overlapping identifications one by one. When there are overlapping identifications, the analyst needs to examine the retention times, confirmation ion ratios, and similarities of the mass spectrums for a plurality of compound candidates identified for a target peak to select a most likely compound. The target peak is then identified as the selected compound. Further, an unselected compound or compounds are used to identify another peak or peaks, or are regarded as a compound that is not included in the target sample. In such a manner, a correcting work such as deleting results of identification is carried out.

However, in such simultaneous multi-component analysis, the number of target compounds is sometimes large (for example, hundreds or more), and the number of peaks appearing on the chromatogram is huge. For this reason, it is laborious and takes a lot of time to carry out even the work for checking whether each peak has overlapping identifications. Sometimes a peak which has overlapping identifications may be overlooked or a peak may be identified as an incorrect compound. That is, an accurate correcting work may not be carried out. Further, when there are too many overlapping identifications, a correction cannot be manually carried out. For this reason, analysis is occasionally conducted ignoring overlapping identifications, which leads to deteriorated accuracy of the analysis.

CITATION LIST

Patent Literature

Patent Literature 1: JP 2011-33346 A

SUMMARY OF INVENTION

Technical Problem

The present invention is devised in order to solve the above problems, and its object is to provide a data processing device for chromatograph mass spectrometer that can efficiently carry out, when overlapping identifications of a peak arise, a work for eliminating the overlapping identifications through an automatic data processing for identifying a peak on a chromatogram as a compound.

Another object of the present invention is to provide a data processing device for chromatograph mass spectrometer that can select, when overlapping identifications of a peak arise, an appropriate compound related to the peak, namely, identify the peak on a chromatogram as an appropriate compound while reducing time and effort of an analyst.

Solution to Problem

The present invention devised in order to solve the above problems provides a data processing device for chromatograph mass spectrometer that identifies a compound related to a peak detected on a chromatogram created based on data obtained by repeating one of scanning measurement in a predetermined mass-to-charge ratio range, selection ion monitoring (SIM) measurement at the predetermined mass-to-charge ratio, and multiple reaction monitoring (MRM) measurement in a predetermined MRM transition for a target sample using a chromatograph mass spectrometer, the data processing device for chromatograph mass spectrometer including a) a compound information storage unit configured to store compound information including at least one of retention times, retention indexes, mass-to-charge ratios of quantitative ions, mass-to-charge ratios of confirmation ions, confirmation ion ratios, and mass spectrums related to a measurement compound or each of measurement compounds to be determined to be contained, b) a peak identifying unit configured to create chromatograms based on the data obtained by the measurement using the chromatograph mass spectrometer and extract the compounds related to each peak as compound candidates, based on the compound information stored in the compound information storage unit, in peaks detected on the chromatograph; and c) an identical peak related compound candidate extracting unit configured to create a list of the compound candidates extracted by the peak identifying unit and measured peak retention times related to the compound candidates and extract a plurality of the compound candidates that are identical to each other or fall within a predetermined allowable time range for the measured peak retention times, from the list.

Herein, the chromatograph is a gas chromatograph (GC) or a liquid chromatograph (LC). Further, the mass spectrometer may be a mass spectrometer such as a normal single-type quadrupolar mass spectrometer that does not dissociate an ion, or a mass spectrometer, such as a tandem quadrupolar mass spectrometer or a so-called quadrupole time-of-flight (Q-TOF) mass spectrometer, that can conduct an $MS^2$ mass spectrograph analysis. When the mass spectrometer is the former spectrometer, the "scanning measurement" in the present invention is a simple scanning measurement. When the mass spectrometer is the latter spectrometer, the "scanning measurement" in the present invention is product ion scanning measurement in which a mass-to-charge ratio of a precursor ion is fixed. Further, normally, when the mass spectrometer is a mass spectrometer such as a normal single-type quadrupolar mass spectrometer, SIM measurement can be used instead of the scanning measurement. When the mass spectrometer is the mass spectrometer that can conduct the $MS^2$ analysis, MRM measurement can be used instead of the scanning measurement. In a case of the mass spectrometer that can conduct the $MS^2$ analysis, a mass spectrum included in the compound information may be a $MS^2$ spectrum.

In the data processing device for chromatograph mass spectrometer of the present invention, when a data processing is executed on the data collected by repeating, for example, the scanning measurement on the target sample, the peak identifying unit creates a chromatogram (a mass chromatogram or an extracted ion chromatogram) at the mass-to-charge ratio of the quantitative ion defined, for example, for each compound to be measured (measurement compound) by using the collected data, and detects a peak on the chromatogram. The peak identifying unit extracts, based on the compound information stored in the compound information storage unit for each detected peak, the compounds related to each peak as compound candidates so as to identify the peak. Since, in this case, the peak is identified based on whether the peak on the chromatogram matches with a predetermined criterion based on the compound data in the database, a peak is identified as a plurality of compounds (namely, overlapping identifications) in some cases, or a peak is not identified, namely, no component in the database is determined as to the peak in some cases.

Therefore, the identical peak related compound candidate selecting unit creates, based on the results of identification obtained by the peak identifying unit, a list of the extracted compound candidates and measured peak retention times related to the compound candidates. Then, the identical peak related compound candidate selecting unit extracts compound candidates in which the measured peak retention times are identical to each other or fall within a predetermined allowable time range from the list. Note that when any other compound candidates in which the measured peak retention times are identical to a measured peak retention time of a certain compound candidate or fall within the predetermined allowable time do not exist, one peak is related to one compound. That is, overlapping identifications do not exist, and thus such compound candidates do not have to be extracted. As a result, only compound candidates having overlapping identifications can be extracted.

The data processing device for chromatograph mass spectrometer of the present invention may further include a compound candidate grouping unit that groups the compound candidates extracted by the identical peak related compound candidate extracting unit in relation to each peak. Grouped results may be put into a table in which a plurality of compound candidates are related to each group, for example.

The above table that is created by grouping performed by the compound candidate grouping unit indicates relationships between a peak having overlapping identifications and compound candidates related to the peak. Therefore, the data processing device for chromatograph mass spectrometer of the present invention may further include an information output unit that externally outputs information representing the compound candidates grouped in relation to each peak by the compound candidate grouping unit.

In this configuration, for example, an analyst confirms the information displayed on a screen of a display unit through the information output unit, and the analyst judges a most appropriate compound candidate for each peak having overlapping identifications so as to be capable of narrowing down the compound candidates or carrying out final peak identification. In this case, although the analyst needs to do a work such as judging an appropriate compound candidate and correcting the results of identification of the peak, even when a number of compounds to be measured is large or a number of peaks on the chromatogram is large, a work done by the analyst for confirming a peak having overlapping identifications is not necessary. As a result, a burden relating to the peak identification is less than in a conventional case.

Further, a first aspect of the present invention provides the data processing device for chromatograph mass spectrometer, wherein the retention times are stored as the compound information in the compound information storage unit, the data processing device further including a compound candidate determining unit configured to compare, for each group including the plurality of compound candidates grouped by the compound candidate grouping unit and related to a single peak, absolute values in differences between the retention times stored in the compound information storage unit and measured retention times for the plurality of compound candidates included in each group, and determine a compound candidate with a smallest absolute value in the difference as a most likely compound related to a peak at which the compound candidate is extracted.

Further, a second aspect of the present invention provides the data processing device for chromatograph mass spectrometer, wherein the mass spectrums are stored as the compound information in the compound information storage unit, the data processing device further including a compound candidate determining unit configured to calculate, for each group including the plurality of compound candidates grouped by the compound candidate grouping unit and related to a single peak, similarities between the mass spectrums for the plurality of compound candidates included in each group and measured mass spectrums in a peak top position of a chromatogram peak at which the plurality of compound candidates are extracted, and determine a compound candidate with a highest similarity as a most likely compound related to a peak at which the compound candidate is extracted.

Further, a third aspect of the present invention provides the data processing device for chromatograph mass spectrometer, wherein confirmation ion ratio reference values are stored as the compound information in the compound information storage unit, the data processing device further including a compound candidate determining unit configured to calculate, for each groups including the plurality of compound candidates grouped by the compound candidate grouping unit and related to a single peak, absolute values in differences between the reference values of the plurality of the compound candidates included in each group and confirmation ion ratios in a peak top position of a chromatogram peak at which the plurality of compound candidates are extracted, and determine a compound candidate with a smallest absolute value in the difference as a most likely compound related to peak at which the compound candidate is extracted.

Further, a fourth aspect of the present invention provides the data processing device for chromatograph mass spectrometer, wherein the confirmation ion ratio reference values are stored as the compound information in the compound information storage unit, the data processing device further including a compound candidate determining unit configured to calculate, for each group including the plurality of compound candidates grouped by the compound candidate grouping unit and related to a single peak, proportions of the reference values of the plurality of compound candidates included in each group to confirmation ion ratios in a peak top position of a chromatogram peak at which the plurality of compound candidates are extracted, and determine a compound candidate with a smallest absolute value in a difference between the proportion and 1 as a most likely compound related to a peak at which the compound candidate is extracted.

In the data processing device for chromatograph mass spectrometer according to the first to fourth aspects of the present invention, the compound candidate determining unit extracts, based on any one of the retention times, the mass spectrums, and the confirmation ion ratios, a most likely compound candidate from the plurality of compound candidates for each peak having overlapping identifications to determine the most likely compound candidate as the compound related to each peak. As a result, overlapping identifications exist, an analyst does not have to determine a most appropriate compound candidate. Thus, the peaks can be automatically identified as the likely compound candidate.

However, for example, when a plurality of compound candidates in which differences between the retention time information as the compound information and measured retention times are exactly identical to each other exist, the plurality of compound candidates may be determined as they are as the compound related to the peak. That is, one peak does not necessarily have to be identified as a certain compound.

Further, according to the first to fourth aspects, two or more determinations by the compound candidate determining unit are combined, so that compound candidates related to one peak may be selected.

That is, the data processing device for chromatograph mass spectrometer of the present invention further includes a compound candidate determining unit configured to use at least two or more of:

a first determining process for comparing, for each group including the plurality of compound candidates grouped by the compound candidate grouping unit and related to a single peak, absolute values in differences between retention times stored in the compound information storage unit and measured retention times for the plurality of compound candidates included in each group, and determining a compound candidate with a smallest absolute value in the difference as a compound related to a peak at which the compound candidate is extracted;

a second determining process for calculating, for each group including the plurality of compound candidates grouped by the compound candidate grouping unit and related to a single peak, similarities between mass spectrums for the plurality of compound candidates included in each group and measured mass spectrums in a peak top position of a chromatogram peak at which the plurality of compound candidates are extracted, and determining a compound candidate with a highest similarity as a compound related to a peak at which the compound candidate is extracted; and a third determining process for calculating, for each group including the plurality of compound candidates grouped by the compound candidate grouping unit and related to a single peak, absolute values for differences between the reference values of the plurality of the compound candidates included in each group and confirmation ion ratios in a peak top position of a chromatogram peak at which the plurality of compound candidates is extracted, and determining a compound candidate with a smallest absolute value in the difference as the compound related to a peak at which the compound candidate is extracted, or calculating proportions of the reference values of the plurality of compound candidates included in each group to confirmation ion ratios in a peak top position of a chromatogram peak at which the plurality of compound candidates is extracted, and determining a compound candidate with a smallest absolute value in a difference between the proportion and 1 as a compound related to a peak at which the compound candidate is extracted, so as to obtain and determine the compound candidate as a most likely compound related to an extracted peak.

For example, when a plurality of compound candidates in which differences between the retention time information as the compound information and measured retention times are exactly identical to each other exist, similarities between standard mass spectrums and measured mass spectrums are calculated for the plurality of compound candidates, and a compound candidate with a highest similarity may be selected. In such a manner, a peak can be identified as single more likely compound by combining a plurality of different determinations.

The data processing device may further include an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak. As a result, the analyst can confirm only final results of identification of the peak.

Further, in the data processing device for chromatograph mass spectrometer of the present invention, when the mass-to-charge ratios of quantitative ions and the confirmation ions are stored as the compound information, a likely compound candidate is not extracted for each peak by the compound candidate determining unit. Instead of the extraction, the data processing device may further include a compound communality determining unit that compares, for each group including the plurality of compound candidates grouped by the compound candidate grouping unit and related to a single peak, the mass-to-charge ratios of the quantitative ions and the confirmation ions for peak detection and determines whether any common mass-to-charge ratios exists. At this time, the determination may be made that common mass-to-charge ratios exist in a case where a mass-to-charge ratio of a quantitative ion of a certain compound is a mass-to-charge ratio of a confirmation ion of another compound.

When the compound communality determining unit determines that common mass-to-charge ratios do not exist among the mass-to-charge ratios of the quantitative ions, among the mass-to-charge ratios of the confirmation ions, or between the mass-to-charge ratios of the quantitative ion and the mass-to-charge ratios of the confirmation ions, the compounds that are identical or close to each other just in the retention times exist. Thus, overlapping identifications do not exist but a plurality of compounds actually overlaps.

Further, in the data processing device for chromatograph mass spectrometer of the present invention, when the mass-to-charge ratios of quantitative ions and the confirmation ions and the mass spectrums are stored as the compound information, the data processing device may further include a compound communality determining unit that determines whether, for each group including the plurality of compound candidates grouped by the compound candidate grouping unit and related to a single peak, mass-to-charge ratios of a quantitative ion and a confirmation ion for detecting a peak of a single compound candidate are included in a mass spectrum of another compound candidate. In this case, the compound communality determining unit may determine whether the mass-to-charge ratios of the quantitative ion and the confirmation ion are included not for all the peaks on the mass spectrum of the another compound candidate but for a mass spectrum peak selected based on a ratio of intensity to t a base peak in the mass spectrum. Also in this configuration, similarly to the above configuration, it can be determined that overlapping identifications do not exist but a plurality of compounds actually overlaps.

Further, normally, as for compound candidates that are not determined as being likely, a study is made whether identification on another peak that is not identified and in which the retention time is close is enabled. When the identification on the other peak is enabled, a work for correcting the results of identification of the peak, namely, the relations between peaks and compounds is done. This case is convenient if the results of identification of the peak before correction can be referred to as necessary. Therefore, in the data processing device for chromatograph mass spectrometer of the present invention, when results obtained by grouping in relation to each peak by the compound candidate grouping unit are corrected, the results before correction are enabled to be automatically saved and to be displayed according to a predetermined operation.

Advantageous Effects of Invention

According to the data processing device for chromatograph mass spectrometer of the present invention, even when overlapping identifications arise by an automatic data processing for identifying a peak on a chromatogram as a certain compound, an analyst does not have to confirm a peak having overlapping identifications. As a result, the analyst can easily confirm the peak having overlapping identifications and compound candidates. Therefore, while time and effort of the analyst is being reduced, namely, efficiently correct compounds related to each peak on the chromatogram can be determined. Further, in the above-described data processing device for chromatograph mass spectrometer according to the first to fourth aspects, since a most likely compound is automatically selected for each peak having overlapping identifications, even if a lot of overlapping identifications arise, appropriate peak identifications can be carried out without placing a heavy burden on the analyst.

DESCRIPTION OF EMBODIMENTS

A gas chromatograph mass spectrometer (GC-MS) system according to one embodiment having a data processing device for chromatograph mass spectrometer of the present invention will be described in detail below with reference to the accompanying drawings.

Figure 1:
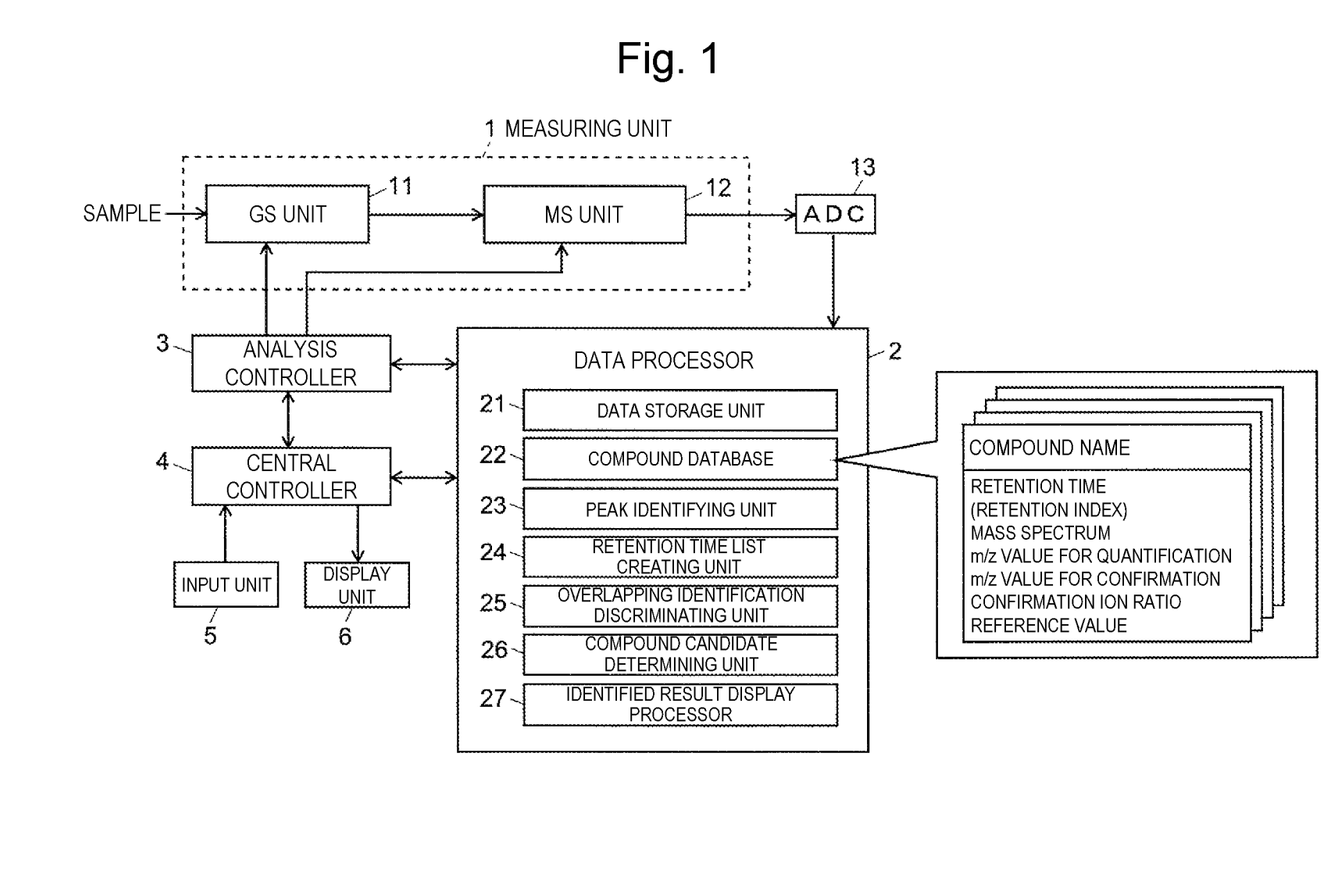
FIG. 1 is a schematic configurational diagram of a gas chromatograph mass spectrometer (GC-MS) system according to one embodiment having a data processing device for chromatograph mass spectrometer of the present invention.

The GC-MS system according to the present embodiment includes a measuring unit 1 including a gas chromatograph (GC) unit 11 and a mass spectrometer (MS) unit 12, an analog-digital converter (ADC) 13 that digitizes a signal obtained by the measuring unit 1, a data processor 2 that stores and processes data converted by the ADC 13, an analysis controller 3 that controls an operation of the measuring unit 1, a central controller 4 that controls the entire system, and an input unit 5 and a display unit 6 that are user interfaces.

Not illustrated, the GC unit 11 includes a sample vaporizing chamber where a small amount of liquid sample is vaporized, a column that separates a sample component introduced along a flow of a carrier gas in a time direction, and a column oven that adjusts a temperature of the column. Further, the MS unit 12 is, for example, a quadrupolar mass spectrometer, and ionizes a sample component introduced from the GC unit 11 and separates the generated ion according to a mass-to-charge ratio to detect the ion.

The data processor 2 includes a data storage unit 21, a compound database 22, a peak identifying unit 23, a retention time list creating unit 24, an overlapping identification discriminating unit 25 (the retention time list creating unit 24 and the overlapping identification discriminating unit 25 correspond to an identical peak related candidate selecting unit of the present invention), a compound candidate determining unit 26, and an identified result display processor 27 as a function block. As illustrated in FIG. 1, compound information about compounds that are expected or likely to be included in a sample to be measured, namely, compounds to be measured is stored in the compound database 22 in advance. The compound information includes standard retention times (or retention indexes), standard mass spectrums, mass-to-charge ratios of quantitative ions, mass-to-charge ratios of confirmation ions, and confirmation ion ratio reference values. Names of the compounds are related to the compound information.

Note that functions of the data processor 2, the analysis controller 3, and the central controller 4 can be realized by executing dedicated control and processing software installed in a personal computer or a high-performance work station as hardware.

Figure 2:
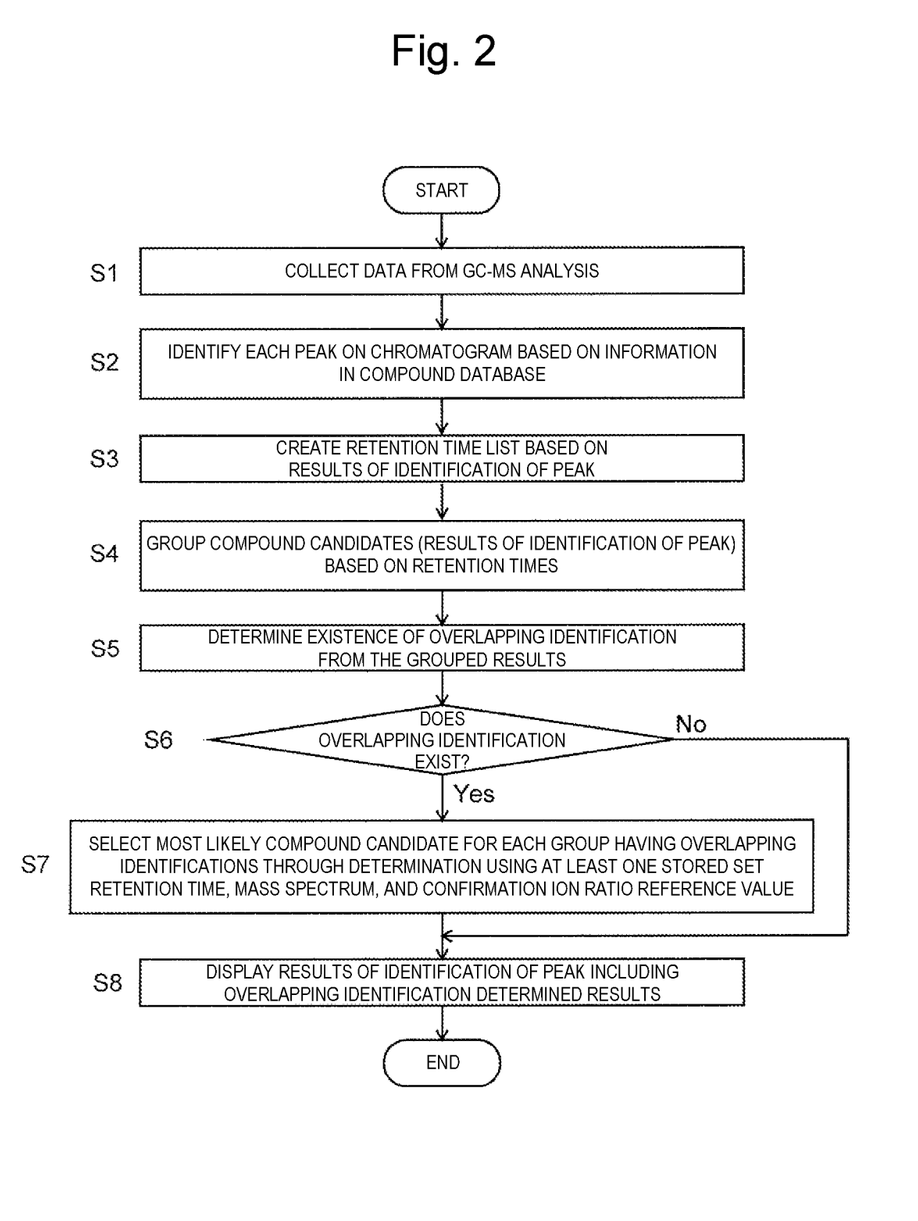
FIG. 2 is a flowchart illustrating a procedure of a work and a process for confirming a compound included in a target sample using the GC-MS system according to the present embodiment.

FIG. 2 is a flowchart illustrating a procedure of a work and a process for confirming a compound to be measured included in a target sample using the GC-MS system according to the present embodiment. FIGS. 3A-3D are an explanatory diagram of a peak identifying process characteristic in the confirming process.

First, the measuring unit 1 conducts GC-MS analysis on a target sample to collect data (step S1). That is, when an analyst performs a predetermined operation using the input unit 5, the measuring unit 1 conducts the GC-MS analysis on the target sample under control of the analysis controller 3 that receives an instruction from the central controller 4. At this time, the MS unit 12 repeats scanning measurement over a preset mass-to-charge ratio range, and mass spectrum data of the mass-to-charge ratio range is input into the data processor 2 at each one scanning measurement to be stored in the data storage unit 21.

The peak identifying unit 23 then refers to the compound information stored in the compound database 22, and executes a peak identifying process based on the collected data (step S2).

Specifically, the peak identifying unit 23 creates, based on the collected data, mass chromatograms (extracted ion chromatograms) at the mass-to-charge ratio of a quantitative ion and the mass-to-charge ratio of a confirmation ion in the predetermined time range including the retention time for each compound stored in the compound database 22, and detects a peak on the mass chromatogram. As for a certain compound to be measured, a peak top position of a peak on the mass chromatogram at the mass-to-charge ratio of the quantitative ion is used as a measured retention time, and a determination is made whether a difference between the measured retention time and the retention time stored in the compound database 22 (set retention time) is within a predetermined allowable value. When the difference in the retention time is within the allowable value, a determination is further made whether a difference between a confirmation ion ratio calculated from the value of an area of the peak on the mass chromatogram and a confirmation ion ratio reference value is within a predetermined allowable value. When this difference is within the allowable value, the target compound is decided as a compound candidate related to the peak. Note that, as described above, a determination may be made whether a peak is identified as a target compound by determining a similarity of a pattern of the mass spectrum instead of the confirmation ion ratio or in addition to the confirmation ion ratio.

In the above-described peak identifying process, a compound stored in the compound database 22 is related as a compound candidate to each peak detected on the mass chromatogram. However, as is obvious, in some cases, a plurality of compound candidates is related to a single peak or a peak to which no compound candidate is related may exist. Further, since not all compounds to be measured are included in the target sample, a compound to be measured that is not related to any peak may exist. Such results of identification of the peak are once saved in the data storage unit 21.

Note that a peak identifying method is not limited to the above described method. For example, peaks are detected according to a deconvolution process on a total ion chromatogram, and compound identification is carried out by using the compound database 22 for each of the peaks so that compound candidates may be extracted. Further, the peak identification is occasionally carried out by using only the retention times without using the mass spectrum information and the confirmation ion ratios.

A process for discriminating overlapping identifications in initial results of identification of the peak saved in the data storage unit 21 and correcting the results of identification of the peak as necessary will be described below.

Figure 3A:
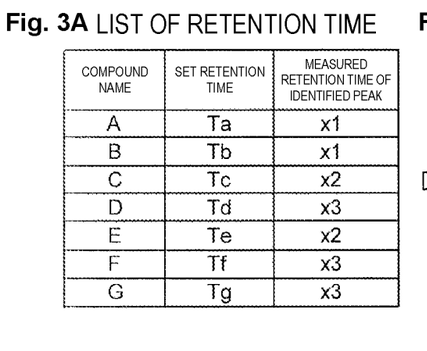
FIGS. 3A-3D are an explanatory diagram of a peak identifying process in the GC-MS system according to the present embodiment.

First, the retention time list creating unit 24 creates a list of measured retention times of identified peaks for all the compounds lined up in the results of identification of the peak (step S3). FIG. 3A shows a simple example of the retention time list. The list includes seven compounds (compound candidates) with names A to G, and Ta to Tg represent retention times related to the compounds A to G, respectively, stored in the compound database 22. Symbols x1, x2, and x3 represent measured retention times of the peaks identified as the compounds at a time of the peak identification at step S2.

Figure 3B:
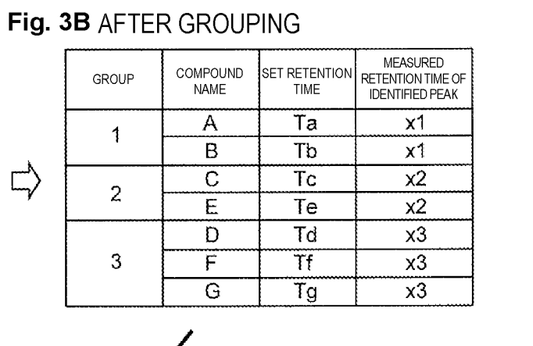

The overlapping identification discriminating unit 25 then selects two or more compounds in which the measured retention times are identical to each other or a difference between the measured retention times is within a predetermined allowable value from the retention time list. All the compounds lined up in the retention time list are grouped so that the plurality of compounds in which the measured retention times are identical to each other or the difference between the measured retention times is within a predetermined allowable value is combined into one group (step S4). FIG. 3B shows results of grouping the compounds listed in the retention time list shown in FIG. 3A. In this example, seven compounds are divided into three groups.

Since a single group is related to a single peak on the chromatogram, a group including a plurality of compounds means that the peak is likely to have overlapping identifications. On the other hand, when a single group includes only a single compound, the peak does not have overlapping identifications. Therefore, the overlapping identification discriminating unit 25 determines whether a group including a plurality of compounds exists so as to determine whether overlapping identifications exist (steps S5, S6). In the example of FIG. 3B, since all the groups include two or more compounds, the determination in step S6 is made as Yes and the process goes to step S7. If overlapping identifications do not exist, the process bypasses step S7 from step S6 to go to S8. Note that when a single group includes a plurality of compounds, namely, might have overlapping identifications, it is not clear whether any compound included in the group is a true compound, and thus the compounds included in the group is absolutely compound candidates.

The compound candidate determining unit 26 then executes any one of the following processes for each group having overlapping identifications so as to select a most likely compound candidate (step S7).

(1) Absolute values in differences between the set retention times of the compound candidates and the measured retention times of the identified peak are calculated, and a compound candidate with a smallest value in the group is selected. In group 1 shown in FIG. 3B, the retention time difference with respect to the compound (compound candidate) A is expressed by |Ta−x1|, and the retention time difference with respect to the compound (compound candidates) B is expressed by |Tb−x1|. If |Ta−x1|<|Tb−x1|, the compound A is selected, and if |Ta−x1|>|Tb−x1|, the compound B is selected.

(2) Similarities in a pattern between standard mass spectrums related to the compound candidates and measured mass spectrums in a peak top position of the identified peak are calculated, and a compound candidate with a largest similarity in the group is selected.

(3) Absolute values in differences between the confirmation ion ratio reference values related to the compound candidates and the confirmation ion ratios obtained from the measured mass chromatograms for the identified peak are calculated, and a compound candidate with a smallest value in the group (namely, the measured confirmation ion ratios is closest to the confirmation ion ratio reference value) is selected.

(4) Ratios of the measured confirmation ion ratios for the identified peak to the confirmation ion ratio reference values related to the compound candidates are calculated, and a compound candidate with a smallest difference (absolute value) between the ratio and 1 is selected. This is, similarly to (3), a method for searching for a compound candidate in which the measured confirmation ion ratio is closest to the confirmation ion ratio reference value.

In the GC-MS system according to the present embodiment, since, as descried above, all the retention times, the standard mass spectrums, and the confirmation ion ratio reference values are stored in the compound database 22 for respective compounds, all the determinations in (1) to (4) can be made. In this case, for example, one compound candidate related to the identified peak may be selected by executing the determining process (1). If the retention times are not stored but the standard mass spectrums are stored in the compound database 22, one compound candidate related to the identified peak may be selected by executing the determining process (2). If both the retention times and the standard mass spectrums are not stored but the confirmation ion ratio reference values are stored in the compound database 22, one compound candidate related to the identified peak may be selected by executing the determining process (3) or (4). That is, the determining processes (1), (2), and (3) or (4) may be preferentially executed in this order.

Figure 3C:
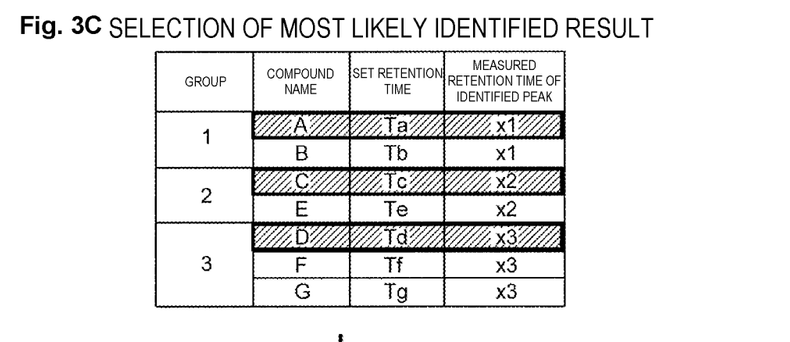

FIG. 3C is a diagram illustrating one example of results after a compound candidate determining process in step S7 is executed on the results of the grouping shown in FIG. 3B. Herein, |Ta−x1|<|Tb−x1|, |Tc−x2|<|Te−x2|, and |Td−x3|<|Tf−x3|<|Tg−x3|. As a result, the compounds (A, C, D) surrounded by thick lines in FIG. 3C are selected in each group.

The identified result display processor 27 clearly presents a compound candidate automatically selected as the most likely compound when overlapping identifications exist, and displays the results of identification of the peak on a screen of the display unit 6 (step S8). As a result, the analyst confirms a peak having overlapping identifications, and can know a most likely compound candidate for the peak.

Figure 3D:
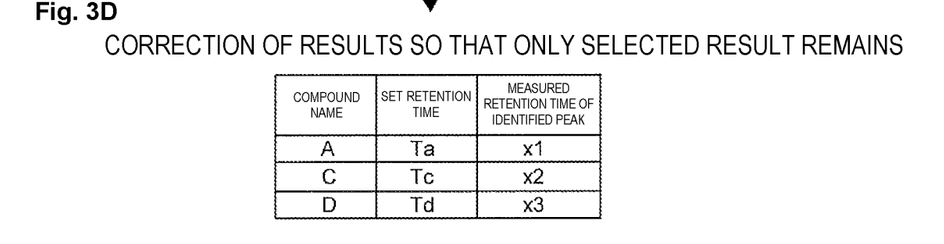

Note that after a notification of the results of identification of the peak is provided in step S8, only a most likely peak identified result, namely, compound candidate is allowed to remain, and the other results of identification of the peak may be automatically deleted. FIG. 3D shows an example where the results other than the most likely peak identified result are deleted from the selected results in FIG. 3C. As a result, the peak identified result without the overlapping identifications remains as a final result.

Note that after the results of identification of the peak are grouped based on the retention times in step S4, the grouped results are displayed on the screen of the display unit 6, and a subsequent work for determining a most likely peak identified result is not done as the automatic data processing but may be done manually by the analyst. In this case, although a most likely compound candidate has to be determined by the analyst, the process for searching for a peak that is likely to have overlapping identifications, and extracting compound candidates related to the peak is automatically executed. For this reason, a burden on the analyst is less than in a conventional case.

Further, when the most likely compound candidate is selected in step S7, two or more of the determinations in (1), (2), and (3) or (4) may be combined. For example, when a plurality of compound candidates included in a single group are exactly identical to each other in the retention times and thus the compound candidates cannot be limited to one, the determination in (2) or (3) is further made so that one compound candidate may be selected for each group.

Further, in steps S3 and S4, retention indexes may be used instead of retention times.

Further, in the peak identifying process in step S2, when a plurality of compound candidates in which the retention times of the peak are identical to each other or differences between the retention times are less than or equal to a predetermined value exist, actually a plurality of different compounds are detected at the identical or very close retention times, namely, actually the plurality of compounds overlap. Therefore, there may be provided a function for comparing, as for a compound group (namely, a plurality of compound candidates included in a single group) in which a single peak is likely to have overlapping identifications under the criterion of the peak identification, the mass-to-charge ratios of quantitative ions and the mass-to-charge ratios of confirmation ions to be used for creating mass chromatograms, and determining whether any common mass-to-charge ratios exist. At this time, the determination may be made that common mass-to-charge ratios exist in a case where a mass-to-charge ratio of a quantitative ion of a certain compound is a mass-to-charge ratio of a confirmation ion of another compound. As for compounds without a common mass-to-charge ratio between the mass-to-charge ratios of the quantitative ions, between the mass-to-charge ratios of the confirmation ions, or between the mass-to-charge ratios of the quantitative ion and the mass-to-charge ratios of the confirmation ions, these compounds are identical or close to each other just in the retention times. Thus, even if a single peak is seen on the chromatogram, it can be determined that the respective compounds exist in the sample.

Further, instead of the above-described function, there may further be provided a function for determining whether, as for a compound group in which a single peak is likely to have overlapping identifications under the criterion of the peak identification, there is, on a mass spectrum stored in relation to a single compound, a peak of a mass-to-charge ratio of a quantitative ion and a mass-to-charge ratio of a confirmation ion used for creating a mass chromatogram of another compound, for each compound included in the compound group. Note that, at this time, the determination is not made whether there exist all the peaks included in the stored mass spectrums at the mass-to-charge ratios of quantitative ions and confirmation ions, but after a target peak is selected based on a ratio of signal intensity to a base peak at which signal intensity is maximum (for example, the target is only a peak in which the ratio of the signal intensity to the base peak is greater than or equal to 0.2), the determination may be made whether there exists a peak of the mass-to-charge ratios of the quantitative ions and the confirmation ions.

Further, in each group where the results of identification of the peak are obtained by grouping based on the retention times, the correcting work has to be done for compound candidates other than the compound candidate determined as most likely in some cases such that the results of identification of the peak are changed into results of another peak that is close to the identified peak in the retention times. Therefore, there may provide a function for indicating a peak originally identified for a certain compound candidate in display on the chromatogram or saving original results of identification of the peak so as to appropriately select a peak other than the originally identified peaks when the analyst tries to correct the results of identification of the peak.

Further, in the GC-MS system according to the above embodiment, the data processing is executed on the data collected by the scanning measurement, but when mass-to-charge ratios of quantitative ions and confirmation ions are stored in the compound database 22, the SIM measurement may be carried out on the mass-to-charge ratios of the quantitative ions and the confirmation ions to collect the data. In this case, since mass spectrums cannot be created, it is obvious that compound candidates cannot be selected by using the mass spectrums.

Further, in the GC-MS system according to the above embodiment, although a single type quadrupolar mass spectrometer is assumed as the MS unit 12, the MS unit 12 may be a tandem quadrupolar mass spectrometer or a Q-TOF mass spectrometer. In this case, product ion scanning measurement is carried out instead of the scanning measurement, or the multiple reaction monitoring (MRM) is carried out instead of the SIM measurement so as to collect the data.

Further, in the above embodiment, the data processing device for chromatograph mass spectrometer of the present invention is applied to the GC-MS system, but it is obvious that the present invention is applicable to data obtained by LC-MS.

Furthermore, suitable modifications, corrections, and additions within the scope of the present invention for the other points are obviously within the scope of the claims in the present application.

REFERENCE SIGNS LIST

1 . . . Measuring Unit
11 . . . Gas Chromatograph (GC) Unit
12 . . . Mass Spectrometer (MS) Unit
13 . . . Analog-Digital Converter
2 . . . Data Processor
21 . . . Data Storage Unit
22 . . . Compound Database
23 . . . Peak Identifying Unit
24 . . . Retention Time List Creating Unit
25 . . . Overlapping Identification Discriminating Unit
26 . . . Compound Candidate Determining Unit
27 . . . Identified Result Display Processor
3 . . . Analysis Controller
4 . . . Central Controller
5 . . . Input Unit
6 . . . Display Unit

The invention claimed is:

1. A data processing device for chromatograph mass spectrometer that identifies a compound related to a peak detected on a chromatogram created based on data obtained by repeating one of scanning measurement in a predetermined mass-to-charge ratio range, selection ion monitoring (SIM) measurement at the predetermined mass-to-charge ratio, and multiple reaction monitoring (MRM) measurement in a predetermined MRM transition for a target sample using a chromatograph mass spectrometer, the data processing device comprising:
   a) a compound information storage unit configured to store compound information including at least one of retention times, retention indexes, mass-to-charge ratios of quantitative ions, mass-to-charge ratios of confirmation ions, confirmation ion ratios, and mass spectrums related to a measurement compound or each of measurement compounds to be determined to be contained;
   b) a peak identifying unit configured to find a peak related to each of the measurement compounds, based on the compound information stored in the compound information storage unit, in peaks detected on chromatograms created for the measurement compounds, based on the data obtained by the measurement using the chromatograph mass spectrometer and extract the compounds as compound candidates related to the peak; and
   c) an identical peak related compound candidate extracting unit configured to create a list of the compound candidates extracted by the peak identifying unit and measured peak retention times related to the compound candidates and extract a plurality of the compound candidates that are identical to each other or fall within a predetermined allowable time range for the measured peak retention times, from the list.

2. The data processing device for chromatograph mass spectrometer according to claim 1, further comprising a compound candidate grouping unit that groups the compound candidates extracted by the identical peak related compound candidate extracting unit in relation to each peak.

3. The data processing device for chromatograph mass spectrometer according to claim 2, further comprising an information output unit that externally outputs information representing the compound candidates grouped in relation to each peak by the compound candidate grouping unit.

4. The data processing device for chromatograph mass spectrometer according to claim 2,
   wherein the retention times are stored as the compound information in the compound information storage unit,
   the data processing device further comprising a compound candidate determining unit configured to compare, for each group including the plurality of compound candidates grouped by the compound candidate grouping unit and related to a single peak, absolute values in differences between the retention times stored in the compound information storage unit and measured retention times for the plurality of compound candidates included in each group, and determine a compound candidate with a smallest absolute value in the difference as a most likely compound related to a peak at which the compound candidate is extracted.

5. The data processing device for chromatograph mass spectrometer according to claim 4, further comprising an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak.

6. The data processing device for chromatograph mass spectrometer according to claim 2,
   wherein the mass spectrums are stored as the compound information in the compound information storage unit,
   the data processing device further comprising a compound candidate determining unit configured to calculate, for each group including the plurality of compound candidates grouped by the compound candidate grouping unit and related to a single peak, similarities between the mass spectrums for the plurality of compound candidates included in each group and measured mass spectrums in a peak top position of a chromatogram peak at which the plurality of compound candidates are extracted, and determine a compound candidate with a highest similarity as a most likely compound related to a peak at which the compound candidate is extracted.

7. The data processing device for chromatograph mass spectrometer according to claim 6, further comprising an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak.

8. The data processing device for chromatograph mass spectrometer according to claim 2,
   wherein the confirmation ion ratio reference values are stored as the compound information in the compound information storage unit,
   the data processing device further comprising a compound candidate determining unit configured to calculate, for each group including the plurality of compound candidates grouped by the compound candidate grouping unit and related to a single peak, absolute values in differences between the reference values of the plurality of the compound candidates included in each group and confirmation ion ratios in a peak top position of a chromatogram peak at which the plurality of compound candidates are extracted, and determine a compound candidate with a smallest absolute value in the difference as a most likely compound related to a peak at which the compound candidate is extracted.

9. The data processing device for chromatograph mass spectrometer according to claim 8, further comprising an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak.

10. The data processing device for chromatograph mass spectrometer according to claim 2,
    wherein the confirmation ion ratio reference values are stored as the compound information in the compound information storage unit,
    the data processing device further comprising a compound candidate determining unit configured to calculate, for each group including the plurality of compound candidates grouped by the compound candidate grouping unit and related to a single peak, proportions of the reference values of the plurality of compound candidates included in each group to confirmation ion ratios in a peak top position of a chromatogram peak at which the plurality of compound candidates are extracted, and determine a compound candidate with a smallest absolute value in a difference between the proportion and 1 as a most likely compound related to a peak at which the compound candidate is extracted.

11. The data processing device for chromatograph mass spectrometer according to claim 10, further comprising an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak.

12. The data processing device for chromatograph mass spectrometer according to claim 2, further comprising:
a compound candidate determining unit configured to use two or more of:
a first determining process for comparing, for each group including the plurality of compound candidates grouped by the compound candidate grouping unit and related to a single peak, absolute values in differences between retention times stored in the compound information storage unit and measured retention times for the plurality of compound candidates included in each group, and determining a compound candidate with a smallest absolute value in the difference as a compound related to a peak at which the compound candidate is extracted;
a second determining process for calculating, for each group including the plurality of compound candidates grouped by the compound candidate grouping unit and related to a single peak, similarities between mass spectrums for the plurality of compound candidates included in each group and measured mass spectrums in a peak top position of a chromatogram peak at which the plurality of compound candidates are extracted, and determining a compound candidate with a highest similarity as a compound related to a peak at which the compound candidate is extracted; and
a third determining process for calculating, for each group including the plurality of compound candidates grouped by the compound candidate grouping unit and related to a single peak, absolute values for differences between the reference values of the plurality of the compound candidates included in each group and confirmation ion ratios in a peak top position of a chromatogram peak at which the plurality of compound candidates are extracted, and determining a compound candidate with a smallest absolute value in the difference as the compound related to a peak at which the compound candidate is extracted, or calculating proportions of the reference values of the plurality of compound candidates included in each group to confirmation ion ratios in a peak top position of a chromatogram peak at which the plurality of compound candidates are extracted, and determining a compound candidate with a smallest absolute value in a difference between the proportion and 1 as a compound related to a peak at which the compound candidate is extracted,
so as to obtain and determine a compound candidate as a most likely compound related to an extracted peak.

13. The data processing device for chromatograph mass spectrometer according to claim 12, further comprising an identified result organizing unit that automatically deletes, for each group including the plurality of compound candidates related to a single peak, from the plurality of compound candidates, compound candidates other than the compound candidate determined as the most likely compound by the compound candidate determining unit as unnecessary results of identification of the peak.

14. The data processing device for chromatograph mass spectrometer according to claim 2,
wherein the mass-to-charge ratios of the quantitative ions and the confirmation ions are stored as the compound information in the compound information storage unit, the data processing device further comprising:
a compound communality determining unit that compares, for each group including the plurality of compound candidates grouped by the compound candidate grouping unit and related to a single peak, the mass-to-charge ratios of the quantitative ions and the confirmation ions for peak detection and determines whether any common mass-to-charge ratios exists.

15. The data processing device for chromatograph mass spectrometer according to claim 2,
wherein the mass-to-charge ratios of the quantitative ions and the confirmation ions and the mass spectrums are stored as the compound information in the compound information storage unit, the data processing device further comprising:
a compound communality determining unit that determines whether, for each group including the plurality of compound candidates grouped by the compound candidate grouping unit and related to a single peak, mass-to-charge ratios of a quantitative ion and a confirmation ion for detecting a peak of a single compound candidate are included in a mass spectrum of another compound candidate.

16. The data processing device for chromatograph mass spectrometer according to claim 15, wherein the compound communality determining unit determines whether the mass-to-charge ratios of the quantitative ion and the confirmation ion are included for a mass spectrum peak selected based on a ratio of intensity to a base peak are included in the mass spectrum of the another compound candidate.

17. The data processing device for chromatograph mass spectrometer according to claim 2, wherein when results obtained by grouping in relation to each peak by the compound candidate grouping unit are corrected, the results before correction are enabled to be automatically saved and to be displayed according to a predetermined operation.

* * * * *